(12) United States Patent
Carmona Duarte et al.

(10) Patent No.: US 10,977,422 B2
(45) Date of Patent: Apr. 13, 2021

(54) METHOD AND SYSTEM FOR GENERATING HANDWRITTEN TEXT WITH DIFFERENT DEGREES OF MATURITY OF THE WRITER

(71) Applicant: UNIVERSIDAD DE LAS PALMAS DE GRAN CANARIA, Las Palmas (ES)

(72) Inventors: Maria Cristina Carmona Duarte, Las Palmas de Gran Canaria (ES); Miguel Angel Ferrer Ballester, Las Palmas de Gran Canaria (ES)

(73) Assignee: UNIVERSIDAD DE LAS PALMAS DE GRAN CANARIA, Las Palmas (ES)

( * ) Notice: Subject to any disclaimer, the term of this patent is extended or adjusted under 35 U.S.C. 154(b) by 74 days.

(21) Appl. No.: 16/308,305

(22) PCT Filed: Jun. 1, 2017

(86) PCT No.: PCT/ES2017/000070
§ 371 (c)(1),
(2) Date: Dec. 7, 2018

(87) PCT Pub. No.: WO2017/216400
PCT Pub. Date: Dec. 21, 2017

(65) Prior Publication Data
US 2019/0303422 A1    Oct. 3, 2019

(30) Foreign Application Priority Data

Jun. 17, 2016  (ES) ............................... ES201600539

(51) Int. Cl.
*G06F 40/10*       (2020.01)
*G06K 9/00*        (2006.01)
*E04F 11/18*       (2006.01)

(52) U.S. Cl.
CPC .......... *G06F 40/10* (2020.01); *E04F 11/1834* (2013.01); *E04F 11/1853* (2013.01); *G06K 9/00416* (2013.01); *E04F 2011/1823* (2013.01)

(58) Field of Classification Search
None
See application file for complete search history.

(56) References Cited

U.S. PATENT DOCUMENTS 5,327,342 A    7/1994  Roy
7,227,993 B2   1/2007  Xu et al.
(Continued)

FOREIGN PATENT DOCUMENTS

GB    2 394 348 A     4/2004
WO    92/14219 A1     8/1992
(Continued)

OTHER PUBLICATIONS

Plamondon, Rejean, and Frans J. Maarse. "An evaluation of motor models of handwriting." IEEE Transactions on systems, man, and cybernetics 19, No. 5 (1989): 1060-1072. (Year: 1989).*

(Continued)

*Primary Examiner* — Frank D Mills
(74) *Attorney, Agent, or Firm* — Kramer Amado, P.C.

(57) ABSTRACT

The invention relates to a method and system for generating handwritten text with different degrees of maturity of the writer without needing to have the original text of the writer, thereby allowing the generation of text online (synthesizing temporal movement) and offline (generating the image of the handwriting), the simulation of real development in terms of the number of strokes and the velocity profile of the writer according to his or her progress, and the generation of handwriting of writers with possible neurological and motor disorders.

14 Claims, 3 Drawing Sheets

(56) References Cited

U.S. PATENT DOCUMENTS

| | | | |
|---|---|---|---|
| 7,983,478 B2 | 7/2011 | Liu et al. | |
| 2004/0148577 A1* | 7/2004 | Xu | G06K 9/222 715/268 |
| 2012/0172682 A1 | 7/2012 | Linderman et al. | |
| 2016/0328366 A1* | 11/2016 | Elarian | G06F 40/129 |
| 2016/0328620 A1* | 11/2016 | Elarian | G06K 9/00154 |

FOREIGN PATENT DOCUMENTS

| | | | |
|---|---|---|---|
| WO | 00/78215 A1 | 12/2000 | |
| WO | 2006/042307 A2 | 4/2006 | |
| WO | 2009/018983 A1 | 2/2009 | |

OTHER PUBLICATIONS

Plamondon, Réjean, Christian O'reilly, Javier Galbally, Abdullah Almaksour, and Éric Anquetil. "Recent developments in the study of rapid human movements with the kinematic theory: Applications to handwriting and signature synthesis." Pattern Recognition Letters 35 (2014): 225-235. (Year: 2014).*

Wang, Jue, Chenyu Wu, Ying-Qing Xu, and Heung-Yeung Shum. "Combining shape and physical modelsfor online cursive handwriting synthesis." International Journal of Document Analysis and Recognition (IJDAR) 7, No. 4 (2005): 219-227. (Year: 2005).*

Lin, Zhouchen, and Liang Wan. "Style-preserving English handwriting synthesis." Pattern Recognition 40, No. 7 (2007): 2097-2109. (Year: 2007).*

Djioua, Moussa, and Rejean Plamondon. "A new algorithm and system for the characterization of handwriting strokes with delta-lognormal parameters." IEEE Transactions on Pattern Analysis and Machine Intelligence 31, No. 11 (2008): 2060-2072. (Year: 2008).*

Li, Xiaolin, Marc Parizeau, and Réjean Plamondon. "Segmentation and reconstruction of on-line handwritten scripts." Pattern recognition 31, No. 6 (1998): 675-684. (Year: 1998).*

"English Translations of International Search Report and Written Opinion of the International Searching Authority", dated Sep. 12, 2017 in connections with PCT/ES2017/000070 filed Jun. 1, 2017.

Djioua, et al., "A New Algorithm and System for the Characterization of Handwriting Strokes with Delta-Lognormal Parameters", IEEE Transactions on Pattern Analysis and Machine Intelligence, vol. 31, No. 11, pp. 2060-2072. (Nov. 2009).

Ferrer, et al., "Static Signature Synthesis: A Neuromotor Inspired Approach for Biometrics", IEEE Transactions on Pattern Analysis and Machine Intelligence, Mar. 1, 2015 IEEE Computer Society, USA, vol. 37, No. 3, pp. 667-680. (Mar. 2015).

Plamondon, et al., "Recent developments in the study of rapid human movements with the kinematic theory: Applications to handwriting and signature synthesis", Pattern Recognition Letters, vol. 35, pp. 225-235. (2014).

Ramaiah, et al., "A Sigma-Lognormal Model for Handwritten Text CAPTCHA Generation", Proceedings of the International Conference on Pattern Recognition, pp. 250-253 (2014).

Thomas, et al., "Synthetic handwritten CAPTCHAs", Pattern Recognition 42, pp. 3365-3373 (2009).

* cited by examiner

METHOD AND SYSTEM FOR GENERATING HANDWRITTEN TEXT WITH DIFFERENT DEGREES OF MATURITY OF THE WRITER

The present invention relates to the generation of handwritten texts, more particularly to a method and system for generating handwritten text of synthetic writers and the development thereof over time for text online (synthesizing temporal movement) and offline (generating the image of the handwriting).

FIELD OF THE INVENTION

The invention is comprised in the technical field of handwritten text synthesis. The invention relates to methods for generating handwritten text that is as similar as possible to human text by means of a computing device.

The methods of the current state of the art fail to solve the problem of generating handwritten text with different degrees of maturity of the writer, which simulates the development of the writer and allows, by means of the minimum number of parameters, simulating both the positions of the pen or pencil over time and the way of writing depending on the writer's age or learning time.

This patent proposes a method and system for generating handwritten text with different degrees of maturity of the writer without needing to have the original text. It allows the simulation of real development in terms of the number of strokes and the velocity profile of the writer according to his or her progress. It enables generating the handwriting of writers with possible neurological and motor disorders.

This new method and system allows solving technical problems arising in the OCR of handwritten text, improves writer identification, allows tracking the progress of children who are learning to write, and provides an improvement in terms of neurodegenerative disease and dysgraphia monitoring and screening.

BACKGROUND OF THE INVENTION

Research on handwriting synthesis is used in different fields. A first reason for the use thereof was to provide a large database of biometric writing to evaluate automatic signature verifiers or automatic writer identifiers and to avoid legal problems concerning privacy [U.S. Pat. No. 7,227,993 (B2)]. Today, it is understood that the inclusion in a handwriting synthesizer of intra- and interpersonal variability and health variability due to different diseases such as Parkinson's disease or Alzheimer's disease, etc., may help to improve understanding of the underlying processes in human handwriting production. Artistic creations and the generation of CAPTCHAs constitute another reason [Chetan Ramaiah, Réjean Plamondonm, and Venu Govindaraju, *A Sigma-Lognormal Model for Handwritten Text CAPTCHA Generation*, in: Proceedings of the International Conference on Pattern Recognition, 2014, pp. 250-255.], [O. Thomas, A. Rusu, V. Govindaraju, *Synthetic handwritten CAPTCHAs, Pattern Recognition* 42 (2009) 3365-3373].

Some patent documents seek to solve the technical problem of generating synthetic handwritten text. For example, patent document U.S. Pat. No. 5,327,342 (A) relates to a method for producing simulated handwriting, and more particularly to an apparatus and a method for producing handwriting that simulates the user's own handwriting.

Patent document WO 2006042307 (A2) relates a method and an apparatus for generating a realistic handwritten communication.

Patent document U.S. Pat. No. 7,227,993 (B2) relates to a learning-based system and a process for synthesizing cursive handwriting.

Patent document U.S. Pat. No. 7,983,478 B2 relates to Markov model-based calligraphy generation.

Patent document GB 2394348 relates to a synthesis method which, based on the handwriting data of a user, generates other letters of the same user by means of dividing into glyphs and storing in a memory.

Patent document U.S. Pat. No. 7,227,993 B2 describes a method which generates cursive letters similar to those of the user. It is also based on taking an image of the user's letter (glyphs) and adding variations in the image. It does not simulate the velocity profile.

These methods are based on processing the image of the handwritten text, so processing time increases. They neither simulate the learning and variability obtained with practice nor provide the positions of the pencil with its temporal reference.

Patent document WO 2000078215 (A1) relates to a method for analyzing motor skill based on measuring and monitoring motor control by means of the approximation of a lognormal summation with different parameters of the velocity profile obtained from the writing on a digitizing tablet.

Patent document WO 1992014219 (A1) relates to a method for digitizing and segmenting writing movement based on curvilinear movement and angular speed. Based on a previous user movement, it parameterizes the data in order to retrieve it again.

Patent document WO 2009018983 (A1) relates to a method to animate writing by means of a virtual pen which writes and draws, synthesizing different types of shapes and texts.

In turn, the paper that comes closest to solving the technical problem of generating synthetic signatures with handwritten text, providing the possibility of generating variability in the signatures and text, has been presented in [Ferrer, M. A.; Diaz-Cabrera, M.; Morales, A., "*Static Signature Synthesis: A Neuromotor Inspired Approach for Biometrics*," *IEEE Transactions on Pattern Analysis and Machine Intelligence*, vol. PP, no. 99, pp. 1, 1 (2015)]. The method is based on fixing in the points of a grid the position and trajectory of the character to be generated, joining all the generated characters to form words, and then applying a method for generating the text, as if it was real text, by fixing the values of filters simulating the neuromuscular model. This model generates variability by varying the distances in the grid, the inclination of the grid, and by varying the parameters of the filters to simulate letters written at different speeds. The drawback of this model is that it cannot simulate the variability that occurs naturally in a writer over time and does not allow varying the parameters to simulate writers of different ages.

These preceding methods fail to solve the problem of generating, without using real written text, written text that simulates the different ages of the writer and allows, by means of the minimum number of parameters, simulating the positions of the pen or pencil over time and the way of writing depending on the writer's age, degree of maturity, or learning time.

Therefore, the technical problems that remain unsolved include: the synthesis of text similar to the real text, simulating real development in terms of the number of strokes and the velocity profile of the writer according to his or her progress and providing the possibility of varying parameters which may be related to neurological or motor parameters of human learning in a simple manner.

SUMMARY OF THE INVENTION

The present invention relates to a new method and system for generating valid handwritten text for writers with different degrees of maturity.

Unlike other solutions proposed on an international level, the method of the present invention allows generating valid handwritten text for writers with different degrees of maturity without needing to have an earlier original text of the writer, simulating real development in terms of the numbers of strokes and the velocity profile of the writer according to his or her progress and providing the possibility of varying parameters which may be related to neurological or motor parameters of human learning in a simple manner.

The invention comprises the following steps:

(i) for each letter to be synthesized, selecting its $n_{sl}$ points making up its trajectory such that they allow performing paragraph (ii), said points having been previously stored in a memory such that each point of the trajectory thereof corresponds with a specific point of a common grid for any type of character to be synthesized, (ii) applying the method for generating temporal handwritten text development which is characterized by selecting a percentage E of initial points $n_{sl}$ that the trajectory of each letter has. Percentage E is inversely proportional to the development or maturity of the writing. A rule on the legibility of the synthesized text is set. In the event that the rule on legibility is not complied with, the selection of points is repeated again until the rule on legibility is complied with, (iii) connecting each of the letters forming the word by joining the end point of the preceding letter to the initial point of the next letter, making sure that the upper and lower lines of the grid are joined together, (iv) transforming the positions of the points of the trajectory into a temporal sequence of vectors and calculating the initial time instant corresponding to each vector depending on the preceding one. For every two consecutive points, one vector $$\overrightarrow{(Q_J Q_{J+1})}$$

(2) is considered, and for every vector the angle $\alpha_j$ between the preceding vector $$\overrightarrow{Q_{J-1}, Q_J}$$

and the current vector $$\overrightarrow{Q_J, Q_{J+1}}$$

is calculated. The delay introduced due to the angle between the vectors ($\alpha_j$) is determined by a predetermined curve (S). The initial time instant of each vector $t_{oj}$ is obtained from S, and constants $K_t$, $K_\alpha$, and $\varepsilon_D$ are obtained, (v) transforming the modulus of each vector into a constant related to the amplitude of the velocity signal. The amplitude $D_j$ of the signal corresponding to vector j is defined proportional to the modulus of each vector, normalized with the minimum distance between the points of the grid, proportional to a constant $K_D$, and with a random person variation by means of a constant $\varepsilon_D$, (vi) synthesizing the velocity profile for each vector based on a predetermined equation ($|\overrightarrow{v_j}(t;t_{oj})|$), starting in initial instant $t_{oj}$, with an amplitude proportional to $D_j$, and adjusting the parameters ($K_\mu$, $K_\sigma$, $K_t$, $K_D$, $K_\alpha$, $\varepsilon_D$, $\varepsilon_t$) for synthesizing an individual with a given maturity and customized characteristics, (vii) generating the final velocity signal by means of adding up the $n_{sl}-1$ signals ($|\overrightarrow{v_j}(t;t_{oj})|$). Components x and y of the final velocity signal are calculated from the angle of each vector ($\emptyset_j$) with respect to axes x and y, and the sign of the direction of each vector, (viii) obtaining the Cartesian trajectory used for representing the synthesized text by integrating components x and y of the final velocity signal, respectively, The details of one or more embodiments of what is described in this summary are set forth in the attached drawings and the following description. Other features, aspects, and advantages of the subject-matter will be clearly understood based on the description, drawings, and claims.

BRIEF DESCRIPTION OF THE DRAWINGS

The drawings are presented so as to illustrate but in no way limit the invention. In the drawings.

DETAILED DESCRIPTION OF THE INVENTION

Although the invention is described in terms of a specific preferred embodiment, it will be obvious for those skilled in the art that various modifications, rearrangements, and replacements can be made. The scope of the invention is defined by the claims attached hereto.

The present invention allows providing a solution to the technical problem of synthesizing text similar to real text without needing to have an earlier original text of the writer, simulating real development in terms of the number of strokes and the velocity profile of the writer according to his or her progress and providing the possibility of varying parameters which may be related to neurological or motor parameters of human learning in a simple manner.

Detailed Description of a Preferred Embodiment of the Invention

The present invention can be implemented in hardware, software, or a combination of both.

Figure 1:
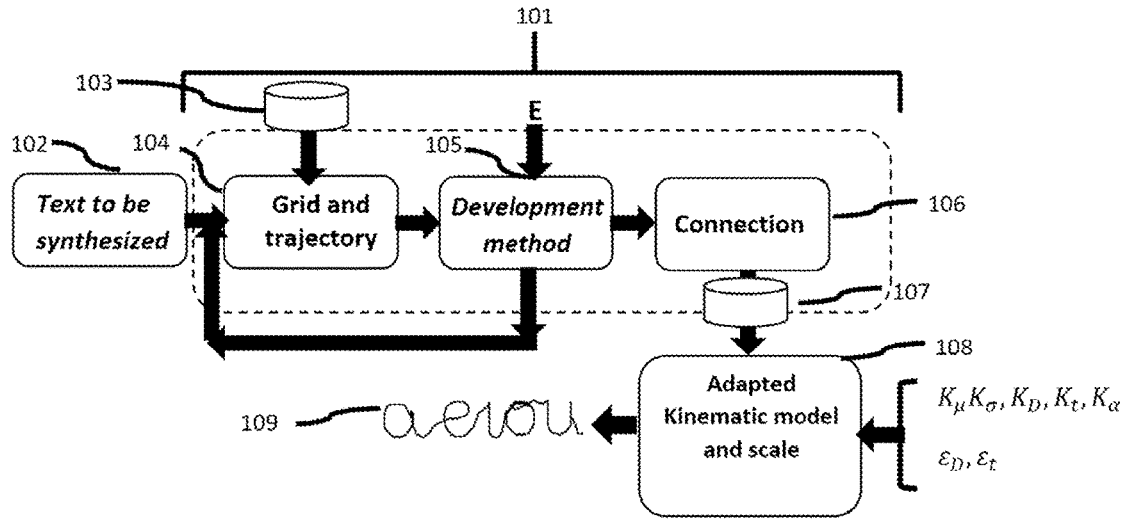
FIG. 1 shows a diagram describing the method according to the invention.

FIG. 1 shows the different steps of the method and how it is possible to solve the technical problem. The first step (101) consists of selecting the trajectory of each letter starting from a previously stored trajectory (103), which process is performed only once when the type of writing or language to learn is programmed. Next, the development method (105), which selects a series of points depending on the writer's age (FIG. 2) and is explained in the following subsection, is applied. The different letters are then joined, making sure that the upper lines (201) and lower lines (204) of the grid are joined to one another.

Unlike in [Ferrer, M. A.; Diaz-Cabrera, M.; Morales, A., "*Static Signature Synthesis: A Neuromotor Inspired Approach for Biometrics,*" IEEE Transactions on Pattern Analysis and Machine Intelligence, vol. PP, no. 99, pp. 1, 1 (2015)], in the proposed method, it is considered that every two consecutive points of the grid is considered a vector $$\overrightarrow{(Q_J Q_{J+1})}$$

(FIG. 2), and furthermore for every vector the angle $\alpha_j$ between the preceding vector $$\overrightarrow{Q_{J-1}, Q_J}$$

and the current vector $$\overrightarrow{Q_J, Q_{J+1}}$$

is also calculated, being defined as:

$$\alpha_j = acos\left(\frac{\langle \overrightarrow{Q_{J-1}, Q_J} \rangle \langle \overrightarrow{Q_J, Q_{J+1}} \rangle}{\|\overrightarrow{Q_{J-1}, Q_J}\| \|\overrightarrow{Q_J, Q_{J+1}}\|}\right), \quad j = 0, 1, 2, \ldots, n_{sl} \quad (1)$$

With these previous calculations, it is considered that for every vector $(\overrightarrow{Q_1 Q_{j+1}})$, parameters $D_j, t_{0j}, \mu_j$, and $\sigma_j$ of a signal are adjusted, said signal modelling the velocity profile and recommended to be a lognormal (or another which, by adjusting the parameters thereof, provides the same adjustment):

$$|\overrightarrow{v_j}(t; t_{0j})| = D_j \Lambda_j(t; t_{0j}, \mu_j, \sigma_j) = \frac{D_j}{\sigma_j \sqrt{2\pi}(t-t_{0j})} e^{\left(\frac{-|ln(t-t_{0j})-\mu_j|^2}{2\sigma_j^2}\right)} \quad (2)$$

where $\mu$ and $\sigma$ are the location and scale parameters, respectively, j indicates the number of the corresponding vector, and $t_{0j}$ is the initial instant where the start of the lognormal is located. The equations and premises that these parameters must have so that handwritten text that looks real and includes the requirements for writer development to be similar to real development can be synthesized, are described below.

Figure 5:
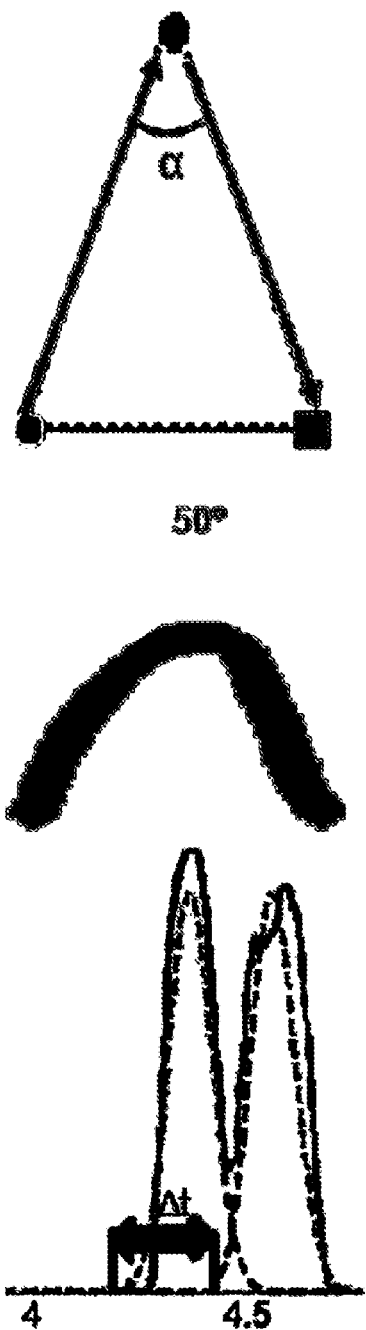
FIG. 5 shows an example of the velocity profile of an adult obtained from drawing an arc (drawing in the middle) with an angle of less than 50°. It is observed in the drawing on the top that the trajectory is formed by two vectors, giving rise to a velocity profile with two independent signals (drawing on the bottom, discontinuous line) modeling the real velocity profile (drawing on the bottom, solid line).

In this method, the value $\sigma_j$ which defines the width of each lognormal, is defined for each similar lognormal and determined by the equation:

$$\sigma_j = K_\sigma \quad (3)$$

where $K_\sigma$ is a constant defined for each writer and is different for different writers. To generate development, the parameter $K_\sigma$ approximates 0.01 so as to simulate children's writing and it gradually varies to a value of 0.05 for adults in order to obtain results like the ones in FIG. 3. If it is desired to approximate the value of a particular person, this value would be adjusted with the last lognormal of the velocity profile of the real person (FIG. 5), when the person makes a quick curved stroke having an angle of less than 600 of the size of the text to be synthesized.

The initial period of each lognormal $t_{0j}$ is expressed as:

$$\begin{cases} t_{oj} = \sum_{l=1}^{j}(k_t + \delta_l + K_\alpha S(-\alpha, 1/15, -70)) \\ \delta_l = N(0, \varepsilon_t), l = 0, 1, 2, \ldots, n_{sl} \end{cases} \quad (4)$$

where $n_{sl}$ is the number of points forming the trajectory of the letter, $K_t$ is a constant which can be set for each writer for setting the small scales of the letters and the mean velocity, $K_\alpha$ is the maximum time of delay due to the angle, $N(0,\varepsilon_t)$ is a random variable which emulates dispersion and is inversely proportional to the writer's skill, and finally the delay introduced due to the angle between the vectors ($\alpha_j$) is determined by a sigmoid curve ($S(\alpha,b,-c)$), where the value of b approximates 0.06 and c approximates 65 for the initial configuration, where said values can be increased or decreased up to 10% to better adjust the writer to be synthesized, and where:

$$S(\alpha, b, c) = \frac{1}{1 + e^{-b(\alpha-c)}} \quad (5)$$

$K_t = 0.04$, $K_\alpha = 0.1$, and $\varepsilon_t = +/-0.02$ is set as the starting adjustment. These values can be adjusted to approximate the real parameters of a writer as explained for the angle. In this case, parameter $K_\alpha$ would be adjusted with a greater time increment ($\Delta t$) (drawing on the bottom in FIG. 5) in the velocity profile of the real person, when the person makes a quick curved stroke having an angle of less than 50 of the size of the text to be synthesized.

Amplitude $D_j$ of the lognormal j is defined proportional to the distance between the points of the trajectory:

$$D_j = K_D(d_{act,j} + N(0,\varepsilon_D))/d_{ref}, j=0,1,2, \ldots, n_{sl} \quad (6)$$

where $d_{act,j}$ is the distance between the points of the trajectory, $Q_j$ to $Q_{j+1}$, $d_{ref}$ is the minimum distance between the points of the grid, $K_D$ is a constant dependent on each individual and can also be used for massive scaling of the letters in the cases in which $K_t$ is not sufficient. $N(0,\varepsilon_D)$ is a random value for each lognormal j. $K_D = d_{ref,j}$, and $\varepsilon_D = 0.3$ is set as the initial adjustment. These values can be adjusted by means of an approximation to adjust them to the real parameters of a writer, when this is the purpose thereof.

The variable $\mu_j$ is equal to a constant $K_\mu$, a constant which depends on the motor characteristics of the subject and is therefore different for each individual. In the experiment performed for obtaining FIG. 3, it was set to zero.

Once all the parameters for each component of the trajectory $\overrightarrow{v}_j(t;t_{oj})$ have been calculated, it is obtained by substituting parameters $D_j, t_{0j}, \mu_j$, and $\sigma_j$ in Equation 2. Finally, the final velocity vector is obtained by means of adding up each of the $\overrightarrow{v}_j(t;t_{oj})$ based on [M. Djioua, R.

Plamondon, *A new algorithm and system for the characterization of handwriting strokes with delta-lognormal parameters*, IEEE Transactions on Pattern Analysis and Machine Intelligence, 31 (2009) 2060-2072]:

$$\vec{v}_n(t) = \sum_{j=1}^{n_{sl}} \vec{v}_j(t;t_{oj}) \quad (8)$$

Components x and y of vector $\vec{v}_j(t)$ are adjusted by calculating the angle of each trajectory $\emptyset_j$, $$\emptyset_j = \left| \text{atan}\left( \frac{Q_{j,y} - Q_{j+1,y}}{Q_{j,x} - Q_{j+1,x}} \right) \right| \quad (9)$$

followed by substituting it into the equations to calculate $v_x(t;t_{oj})$ and $v_y(t;t_{oj})$ from $\vec{v}_j(t;t_{oj})$ by means of (Equation 9) and (Equation 10).

$$\begin{cases} v_{x,j}(t;t_{oj}) = \text{sgn}(Q_{j+1,x} - Q_{j,x})|\vec{v}_j(t;t_{oj})|\cos(\emptyset_j) + Q_{j,x}, \\ \qquad j = 0, 1, 2, \ldots, n_{sl} \\ v_x(t) = \sum_{j=1}^{n_{sl}} v_{x,j}(t;t_{oj}) \end{cases} \quad (10)$$

$$\begin{cases} v_{y,j}(t;t_{oj}) = \text{sgn}(Q_{j+1,y} - Q_{j,y})|\vec{v}_j(t;t_{oj})|\cos(\emptyset_j) + Q_{j,y}, \\ \qquad j = 0, 1, 2, \ldots, n_{sl} \\ v_y(t) = \sum_{j=1}^{n_{sl}} v_{y,j}(t;t_{oj}) \end{cases} \quad (11)$$

Finally, the Cartesian trajectory used for drawing the letter is obtained:

$$x(t) = \int v_x(t) dt \quad (12)$$

$$y(t) = \int v_y(t) dt \quad (13)$$

To synthesize problems relating to the learning or neurological health of the individual, parameters $\varepsilon_D$ and $\varepsilon_t$ are modified, increasing their value the farther away the ideal individual to be synthesized is from the normal value.

To synthesize patients with Parkinson's disease, the time increment between signals representing each vector ($K_t$) is increased. In this manner, the more the disease affects the patient, the less the signals modeling each of the vectors will overlap one another. The vectors of the trajectory are designed in pairs, and in each of the pairs the direction of one offsets the direction of the preceding one (simulates agonist and antagonist muscle movement).

To synthesize patients with Alzheimer's disease, the value of the parameters related to the starting point stability of the signal representing each vector and the error in the trajectory ($\varepsilon_D, \varepsilon_t$) is increased. The higher the value of these parameters, the greater the degree of degeneration will be due to the mentioned disease in adults.

To synthesize patients with amyotrophic lateral sclerosis, the width of the signal representing each vector of the trajectory is increased by varying $K_\sigma \circ K_\mu$ and reducing amplitude ($K_D$). The greater the width and the smaller the amplitude, the greater the degree of degeneration will be due to the disease in adults.

Alternative Method

Instead of using Equation 1, a sinusoid can be used, where:

$$|\vec{v}_J(t;t_{0j})| = \quad (13)$$

$$\begin{cases} D_j\left(K_s \sin\left(2\pi\left(\frac{1}{2\sigma_j}\right)(t + t_{oj}) - \frac{\pi}{2}\right) + 1\right) & \text{for } t + t_{oj} < t \le t + t_{oj} + 2\sigma_j \\ 0 & \text{for the rest of } t \end{cases}$$

The method would be the same as in the preceding method with the exception that in this case the value of $\sigma_j$ (Equation 3) would be multiplied by $K_{Ds}$ as follows:

$$\sigma_j = K_{Ds}(0.01 + K_\sigma) \quad (14)$$

Like $K_s$, the value of $K_{Ds}$ depends on the writer. To simulate a real writer, the value is adjusted by comparing the synthesized value with the rest of the parameters and $K_D$ equal to 1 with the velocity signal obtained from a real sample. The real sample will be obtained from an image captured by means of a digitizing tablet on which the real writer will draw a line of 1 cm.

Method for Temporal Development

Figure 2:
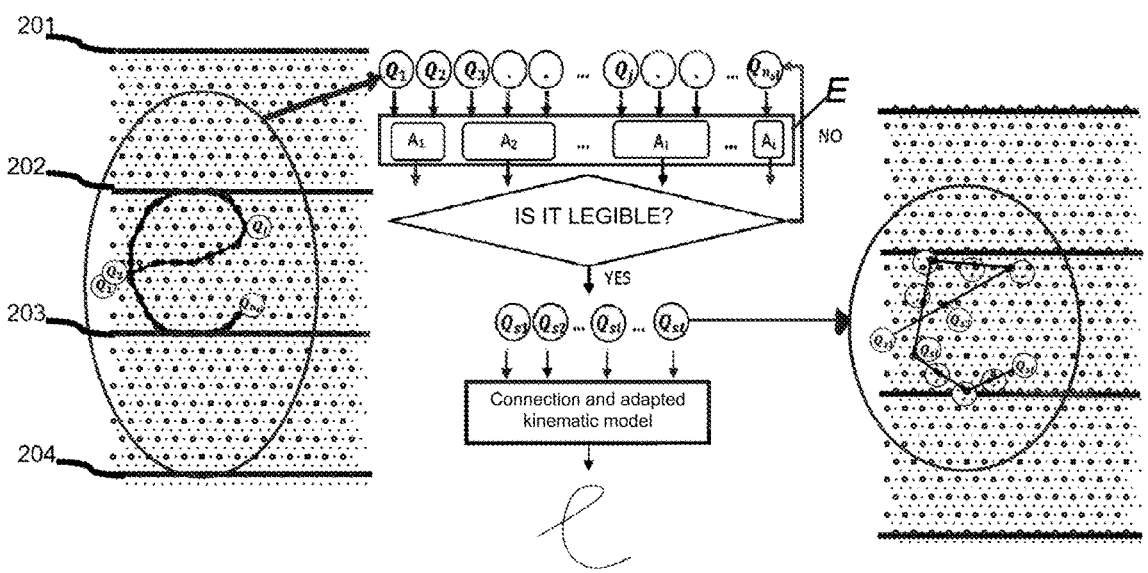
FIG. 2 shows a diagram describing the development method.

This section provides a detailed description of block (103) that is shown in detail in FIG. 2.

This method is based on the premise that, as learning progresses, the number of points used in the writing is smaller, and therefore the length $d_{act,j}$ is greater. To that end, a variable E defining the selected percentage of points for each individual is defined. Therefore, the number of outputs the system will have will be determined by L:

$$L = n_{sl} * \frac{E}{100} \quad (15)$$

This method is described in detail in FIG. 2 and consists of:
1. $n_{sl}$–3 of the points of the trajectory are segmented into L clusters. Each cluster is spaced by $(n_{sl}$–3$)/(L-2)$. For the first and last point, the maximum size is taken into account to maintain legibility.
2. One of the points of the grid is randomly selected from each cluster.
3. To assure legibility, there is a need to at least maintain, if there are any, one of the points which coincides with one of the lines fixed for each language (201) (202) (203) (204). If the rule is not complied with, it is necessary to return to point e until the rule on legibility is complied with.

Once the points of the grid have been calculated, the parameters are calculated with the preceding method.

EXAMPLES

The invention will be illustrated below by means of tests performed by the inventors, which clearly show the efficacy of the invention.

These specific examples that are provided serve to illustrate the nature of the present invention and are included only for illustrative purposes, so they must not be interpreted as limitations of the invention herein claimed. Therefore, the examples described below illustrate the invention without limiting the field of application thereof.

Example 1. Text Synthesized Automatically Offline

Figures 3, 4:
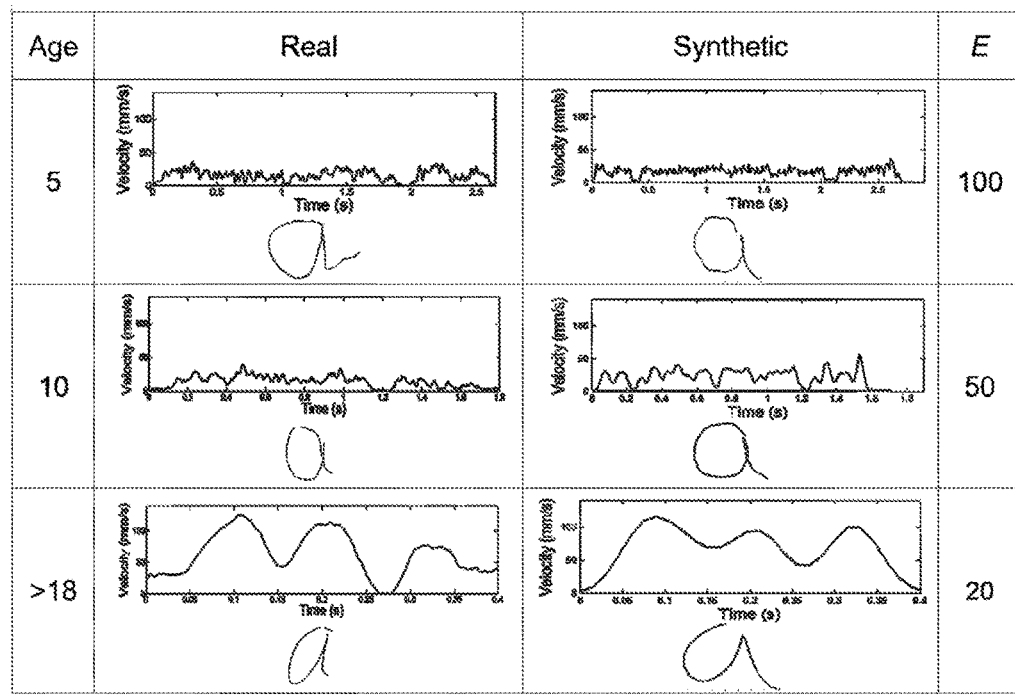
FIG. 3 shows an image with an example of the text generated with the method.
FIG. 4 shows an example of letters synthesized by a writer of different ages and the corresponding speed compared with the real text.

FIG. 3 shows an example of the different handwritings generated from a single initial configuration of the grid and trajectory per letter. These results were obtained by varying development parameter E from E=100 for synthesizing the writing of a child (text in the first row) to E=20 for synthesizing the writing of an adult who writes frequently. Furthermore, to make them more realistic the value of $\varepsilon_D$ and $\varepsilon_t$ was varied linearly from $\varepsilon_D$=0.3 and $\varepsilon_t$=0.02 when E=100 to 0 when E=20. It can be observed how in the synthesized text for E=20, the letters have more variability than the letters generated with E=100. That is due to the fact that in the case of E=20, random points of the trajectories are selected, making the number of possible variations much higher than in children. Therefore, when the value of parameter E is lower, it also synthesizes different writers, whereas when E=100 a single or individual writer is being synthesized, with his or her own variability.

Example 1. Text Synthesized Automatically Online

FIG. 4 shows an example of a real letter 'a' and a letter 'a' synthetically generated online and offline, and the velocity profiles thereof.

To obtain real samples, 20 children (from 5 to 10 years of age) from one and the same school were asked to write the letter 'a' on a Wacom digitizing tablet. The digitizing tablet is a WACOM Intuos 3 tablet with an Intuos 3 Grip Pen, a sampling frequency of 200 Hz, a resolution of 2540 dpi, and a work surface of 304.8 mm×228.6 mm. The same process was carried out with 10 adults over 18 years of age.

The left column of FIG. 4 shows the real results obtained from one of the cases for each age, having confirmed that the other cases of the same age showed the same characteristics. It can be seen how there are more peaks in the velocity profile in the case of 5-year old children than in the adult.

The right column of FIG. 4 shows the results obtained with the letter "a" synthesized by means of the method proposed in this patent. It can be observed how there are also more peaks in the velocity profile when synthesizing the letter written by a child with a value of E=100, in contrast there are only three peaks when synthesizing the letter written by an adult using a value of E=20, which is the same as what occurs for real samples.

The invention claimed is:

1. A method for generating valid synthetic handwritten text for synthetic writers with different degrees of maturity, wherein the different degrees of maturity are related to at least one of an age or learning progress of a particular synthetic writer, wherein points of a grid fix a trajectory of each character to be generated and the points of the grid are stored in a memory, the method comprising:

(i) for each letter to be synthesized, selecting its $n_{sl}$ points making up its trajectory such that they allow performing paragraph (ii);

(ii) selecting randomly a percentage E of initial points $n_{sl}$ that the trajectory of each letter has, wherein the percentage E is inversely proportional to the development or maturity of the writing, and the development or the maturity of the writing are related to either an age or learning progress of a writer;

(iii) connecting each of the letters, forming the word by joining an end point of a preceding letter to an initial point of a next letter, making sure that both upper line and lower line of the grid are joined together;

(iv) transforming the positions of the points for each trajectory into a temporal sequence of vectors, calculating an initial time instant corresponding to each vector depending on a preceding vector, wherein for every two consecutive points, a vector $$\overrightarrow{(Q_J Q_{J+1})} \quad (2)$$

is considered, and, for every vector, an angle $\alpha_j$ between the preceding vector $$\overrightarrow{Q_{J-1}, Q_J}$$

and the current vector $$\overrightarrow{Q_J, Q_{J+1}}$$

is calculated, determining a delay introduced due to the angle between the vectors ($\alpha_j$) by a predetermined curve (S), obtaining an initial time instant of each vector $t_{0j}$ from S, and obtaining constants $K_t$, $K_\alpha$, and $\varepsilon_D$;

(v) transforming the modulus of each vector into a constant $$D_j : D_j = \frac{K_D(d_{act,j} + N(0, \varepsilon_D))}{d_{ref}}; j = 0, 1, 2, \ldots, n_{sl},$$

wherein $d_{act,j}$ is a distance between the points of the trajectory, $Q_j$ to $Q_{j+1}$, $d_{ref}$ is a minimum distance between the points of the grid, $K_D$ is a constant dependent on each individual and $N(0,\varepsilon_D)$ is a random value for each lognormal j;

(vi) synthesizing a velocity profile for each vector based on a predetermined equation ($|\vec{v}_j(t;t_{0j})|$), starting at initial instant $t_{0j}$, with an amplitude proportional to $D_j$, and setting the parameters ($K_\mu$, $K_\sigma$, $K_t$, $K_D$, $K_\alpha$, $\varepsilon_D$, $\varepsilon_t$) for synthesizing an individual with a given maturity and customized characteristics, wherein $K_\mu$ is a constant which depends on the motor characteristics of the subject, which is considered to be zero at first, $K_\sigma$ is a constant defining a width of each of the signals $|\vec{v}_j(t;t_{0j})|$ modeling each of the vectors, and is different for each writer, $K_t$ is a time increment between the start of each of the signals $|\vec{v}_j(t;t_{0j})|$ for every vector and is constant for each letter size and writing speed; wherein it must be smaller than the width of signal ($|\vec{v}_j(t;t_{0j})|$) when synthesizing normal subjects and continuous writing, $K_D$ is a constant dependent on each individual and can also be used for scaling of the letters in the cases in which the increase in $K_t$ is not sufficient to obtain the desired letter size, $K_\alpha$ is a maximum time of delay due to the angle between the current and preceding trajectories, $\varepsilon_D$ is a random variable for generating each ($|\vec{v}_j(t;t_{0j})|$) which modifies the distance at which the points of the trajectory are located, and $\varepsilon_t$ is a random variable which emulates dispersion over time;

(vii) generating a final velocity signal by means of adding up the $n_{sl}-1$ signals $|\vec{v}_j(t;t_{0j})|$, calculating components x and y of the final velocity signal from an angle of each vector trajectory ($\emptyset_j$) with respect to axes x and y, and a sign of a direction of each vector; and (viii) obtaining a Cartesian trajectory used for representing the synthesized text by integrating components x and y of the final velocity signal, respectively.

2. The method according to claim 1, wherein step (ii) of the method further comprises:
   setting a rule on legibility of synthesized text;
   when the rule on legibility is not complied with, repeating the random selection of points again until the rule on legibility is complied with;
   wherein the rule on legibility of the text requires that at least one of the selected points coinciding with the upper line and at least one of the selected points coinciding with the lower line are maintained.

3. The method according to claim 1, characterized in that the predetermined equation of paragraph (vi) is determined by:

$$|\vec{v}_J(t; t_{0j})| = D_j \Lambda_j(t; t_{0j}, \mu_j, \sigma_j) = \frac{D_j}{\sigma_j \sqrt{2\pi}(t - t_{0j})} e^{\left(\frac{-|ln(t-t_{0j})-\mu_j|^2}{2\sigma_j^2}\right)}.$$

4. The method according to claim 1, characterized in that the predetermined equation of paragraph (vi) is determined by:

$$|\vec{v}_J(t; t_{0j})| = \begin{cases} D_j\left(K_s \sin\left(2\pi\left(\frac{1}{2\sigma_j}\right)(t + t_{oj}) - \frac{\pi}{2}\right) + 1\right) & \text{for } t + t_{oj} < t \le t + t_{oj} + 2\sigma_j \\ 0 & \text{for the rest of } t \end{cases}.$$

5. The method according to claim 1, wherein the predetermined sigmoid curve S of paragraph (iv) is approximated by $(S(\alpha, b, -c))$, where the value of b is 0.06 and c is 65.

6. The method according to claim 1, wherein the initial time instant of each vector $t_{oj}$ is expressed as:

$$\begin{cases} t_{oj} = \sum_{l=1}^{j}(K_t + \delta_l + K_\alpha S) \\ \delta_l = N(0, \varepsilon_t), l = 0, 1, 2, \ldots, n_{sl} \end{cases}$$

where $K_t$, $K_\alpha$, and $\varepsilon_D$ are constants.

7. The method according to claim 1, wherein the method is performed by an online computer device, and the velocity profile is generated based upon either the age or the learning progress of the writer.

8. The method according to claim 1, further comprising:
   obtaining writing characteristics of a real person by means of adjusting parameters $K_\mu$, $K_t$, $K_o$, $K_\alpha$ and $K_D$ based on the real velocity profile; and
   obtaining the trajectory vectors from the real writing of the writer to be synthesized.

9. The method according to claim 1, characterized by defining the value of E from 100 to 20 to emulate child-to-adult development.

10. The method according to claim 1, wherein parameters $\varepsilon_D$ and $\varepsilon_t$ are related to learning or neurological health of an individual.

11. The method according to claim 1, further comprising:
   synthesizing patients with Parkinson's disease by means of increasing a time increment between signals $|\vec{v}_j(t; t_{0j})|$ by means of increasing Kt in a manner proportional to the extent of the disease until the value thereof exceeds the width of said signal, wherein the vectors of the trajectory are designed in pairs, and, in each of the pairs, the direction of one vector offsets the direction of the preceding vector.

12. The method according to claim 1, further comprising:
   synthesizing patients with Alzheimer's disease by means of increasing the parameters related to the starting point stability of the signal representing each vector and an error in the trajectory ($\varepsilon_D$, $\varepsilon_t$).

13. The method according to claim 1, further comprising:
   synthesizing patients with amyotrophic lateral sclerosis by means of increasing the width of $|\vec{v}_j(t; t_{0j})|$ by varying $K_o \circ K_\mu$ and reducing an amplitude ($K_D$) thereof.

14. A non-transitory medium with instructions configured to be run by at least one processor, which instructions, when run by an electronic device, cause said electronic device to carry out the method for generating valid synthetic handwritten text for synthetic writers with different degrees of maturity, wherein the different degrees of maturity are related with at least one of an age or learning progress of a particular writer, the non-transitory medium comprising:
   instructions for storing points of a grid in a memory, wherein the stored points fix a trajectory of each character to be generated;
   instructions, for each letter to be synthesized, for selecting $n_{sl}$ points making up the trajectory of the respective letter;
   instructions for selecting randomly a percentage E of initial points $n_{sl}$ that the trajectory of each letter has, wherein the percentage E is inversely proportional to the development or maturity of the writing and the development or the maturity of the writing are related to either an age or learning progress of a writer,
   instructions for connecting each of the letters;
   instructions for forming the word by joining an end point of a preceding letter to an initial point of a next letter, making sure that both upper line and lower line of the grid are joined together;
   instructions for transforming the positions of the points for each trajectory into a temporal sequence of vectors;
   instructions for calculating an initial time instant corresponding to each vector depending on a preceding vector, wherein for every two consecutive points, a vector $$\overrightarrow{(Q_J Q_{J+1})}$$

(2) is considered,
   instructions for calculating, for every vector, an angle $\alpha_j$ between the preceding vector $$\overrightarrow{Q_{J-1}, Q_J}$$

and the current vector $$\overrightarrow{Q_J, Q_{J+1}};$$

instructions for determining a delay introduced due to the angle between the vectors ($\alpha_j$) by a predetermined curve (S);

instructions for obtaining an initial time instant of each vector $t_{0j}$ from S;

instructions for obtaining constants $K_t$, $K_\alpha$, and $\varepsilon_D$;

instructions for transforming the modulus of each vector into a constant $$D_j : D_j = \frac{K_D(d_{act,j} + N(0, \varepsilon_D))}{d_{ref}}; j = 0, 1, 2, \ldots, n_{sl},$$

wherein $d_{act,j}$ is a distance between the points of the trajectory, $Q_j$ to $Q_{j+1}$, $d_{ref}$ is a minimum distance between the points of the grid, $K_D$ is a constant dependent on each individual and $N(0,\varepsilon_D)$ is a random value for each lognormal j;

instructions for synthesizing a velocity profile for each vector based on a predetermined equation ($|\vec{v}_j(t;t_{0j})|$) starting at initial instant $t_{0j}$, with an amplitude proportional to $D_j$;

instructions for setting the parameters ($K_\mu$, $K_\sigma$, $K_t$, $K_D$, $K_\alpha$, $\varepsilon_D$, $\varepsilon_t$) for synthesizing an individual with a given maturity and customized characteristics, wherein $K_\mu$ is a constant which depends on the motor characteristics of the subject, which is considered to be zero at first, $K_\sigma$ is a constant defining a width of each of the signals $|\vec{v}_j(t;t_{0j})|$ modeling each of the vectors, and is different for each writer, $K_t$ is a time increment between the start of each of the signals $|\vec{v}_j(t;t_{0j})|$ for every vector and is constant for each letter size and writing speed; wherein it must be smaller than the width of signal ($|\vec{v}_j(t;t_{0j})|$) when synthesizing normal subjects and continuous writing, $K_D$ is a constant dependent on each individual and can also be used for scaling of the letters in the cases in which the increase in $K_t$ is not sufficient to obtain the desired letter size, $K_\alpha$ is a maximum time of delay due to the angle between the current and preceding trajectories, $\varepsilon_D$ is a random variable for generating each ($|\vec{v}_j(t;t_{0j})|$) which modifies the distance at which the points of the trajectory are located, and $\varepsilon_t$ is a random variable which emulates dispersion over time;

instructions for generating a final velocity signal by means of adding up the $n_{sl}-1$ signals $|\vec{v}_j(t;t_{0j})|$, instructions for calculating components x and y of the final velocity signal are calculated from an angle of each vector trajectory ($\emptyset_j$) with respect to axes x and y, and a sign of a direction of each vector; and instructions for obtaining a Cartesian trajectory used for representing the synthesized text by integrating components x and y of the final velocity signal, respectively.

* * * * *